United States Patent [19]
Sato

[11] Patent Number: 5,639,158
[45] Date of Patent: Jun. 17, 1997

[54] LED-ARRAY LIGHT SOURCE

[75] Inventor: Yuko Sato, Tokyo, Japan

[73] Assignee: NEC Corporation, Tokyo, Japan

[21] Appl. No.: 516,485

[22] Filed: Aug. 17, 1995

[30] Foreign Application Priority Data

Aug. 19, 1994 [JP] Japan .................. 6-195369

[51] Int. Cl.$^6$ .................................. F21V 7/00
[52] U.S. Cl. .............. 362/247; 362/300; 362/301; 362/200; 362/241; 355/70
[58] Field of Search .................. 362/26, 27, 30, 362/29, 240, 241, 237, 247, 249, 252, 800, 298, 300, 301, 307, 311, 346; 355/228, 229, 70; 313/500, 512

[56] References Cited

U.S. PATENT DOCUMENTS

| | | | |
|---|---|---|---|
| 2,831,453 | 4/1958 | Hardesty | 362/26 |
| 3,267,598 | 8/1966 | Olesen et al. | 362/26 |
| 4,941,072 | 7/1990 | Yasumoto et al. | 362/800 |
| 5,032,960 | 7/1991 | Katoh | 362/800 |
| 5,128,842 | 7/1992 | Kenmochi | 362/27 |
| 5,130,761 | 7/1992 | Tanaka | 362/301 |
| 5,247,429 | 9/1993 | Iwase et al. | 362/20 |

FOREIGN PATENT DOCUMENTS 4-29379   1/1992   Japan .

Primary Examiner—Denise L. Gromada
Assistant Examiner—Thomas M. Sember
Attorney, Agent, or Firm—Young & Thompson

[57] ABSTRACT

An LED-array light source comprises an LED-array and a light-transmitting member disposed thereon. The light-transmitting member has a pair of opposed major surface for receiving and emitting output light emitted from the LED-array. A plurality of a first reflectors are formed on a light emitting surface of the light-transmitting member so as to partially reflect the output light toward a light-receiving surface of the light-transmitting member. A second light reflector is provided on the light receiving surface of the light-transmitting member so as to rereflect the light reflected from the first reflector to the emitting surface and thereby guiding the output light from the LED-array to an intermediate area between adjacent LEDs. Thus, it is possible to obtain a uniform linear light source with small number of LEDs.

8 Claims, 4 Drawing Sheets

LED-ARRAY LIGHT SOURCE

BACKGROUND OF THE INVENTION

1. Field of the Invention

The present invention relates to a linear light source used in a facsimile device or scanner and, more particularly, to an LED-array light source in which a number of LEDs (Light Emitting Diode) are linearly arranged as a light source for a contact-type image sensor.

2. Description of the Prior Art

Recently, an LED-array light source constituted by linearly arranging a number of LEDs is widely used as a linear light source for irradiating an original copy for a contact-type image sensor in an image reader for a facsimile device or scanner.

Since each LED of the LED-array emits a directional light, it is necessary to linearly arrange a large number of LEDs to obtain uniform linear illumination. If LEDs are arranged in a pitch of 6.5 mm, illuminance distribution becomes substantially even on the surface of an original so that uniform linear illumination can be obtained.

In view of cost, it is desirable to reduce the number of LEDs as long as there arises no problem in uniform illuminance distribution for reading the original copy. However, if the number of LEDs is reduced so as to arrange them in, for example, a pitch of 16 mm, the illuminance distribution becomes uneven on the surface of the original. Japanese Unexamined Patent Publication (Kokai) No. 4-29379 proposes an LED-array light source which can reduce the number of LEDs.

As is shown in FIGS. 5(a) and (b), a number of LEDs 52 are arranged on an elongated printed circuit board 51 in a row, and sealed by transparent resin 53. A light adjusting mask 55 is provided on the sealing resin 53. The light adjusting mask 55 is made of a thin transparent film provided with shielding pattern 54 which intermittently shields the illumination light from the LED 52.

However, the shielding pattern 54 has a disadvantage that, because the shielding pattern 54 is intended to maintain uniformity for an area with low illuminance by reducing the illuminance at areas with higher illuminance so that the overall illuminance is significantly deteriorated and the efficiency in use of illumination light from the LED becomes low. In addition, the shielding pattern affects the illuminance distribution as a shadow so that it cannot provide sufficient effect in uniformity the illuminance distribution.

An object of the present invention is to provide an LED-array light source in which the number of LED devices is reduced, but the efficiency in use of illumination light is enhanced and uniform illuminance distribution is attained.

BRIEF SUMMARY OF THE INVENTION

The LED-array light source according to the present invention is characterized in that a plurality of a first and second reflecting members are formed on a incident surface and an emitting surface of a light-transmitting member, respectively, which is disposed on the top of an LED-array. Each of the first reflecting members has a central region opposite to each LED and a pair of a peripheral region opposite to the outside of each LED. Each of the first reflecting members is provided relative to each LED so that it reflects a part of output light from the LED toward the incident surface. On the other hand, the second reflecting members rereflect the light reflected from the first reflecting numbers toward the emitting surface, and thereby guiding a portion of the output light from the LED so as to be passed through a central area between adjacent first reflecting members.

BRIEF DESCRIPTION OF THE DRAWINGS

This above-mentioned and other objects, features and advantages of this invention will become more apparent by reference to the following detailed description of the invention taken in conjunction with the accompanying drawings, wherein.

DETAILED DESCRIPTION OF THE PREFERRED EMBODIMENTS

Figure 1A:
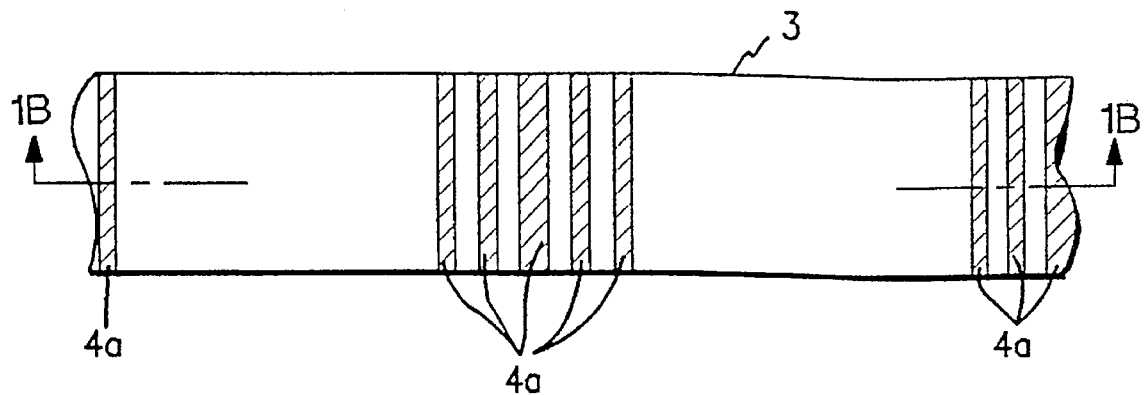
FIG. 1(a) is a plan view of the top of a light-transmitting member provided with a plurality of reflecting members according to the first embodiment of the present invention.
Figure 1B:
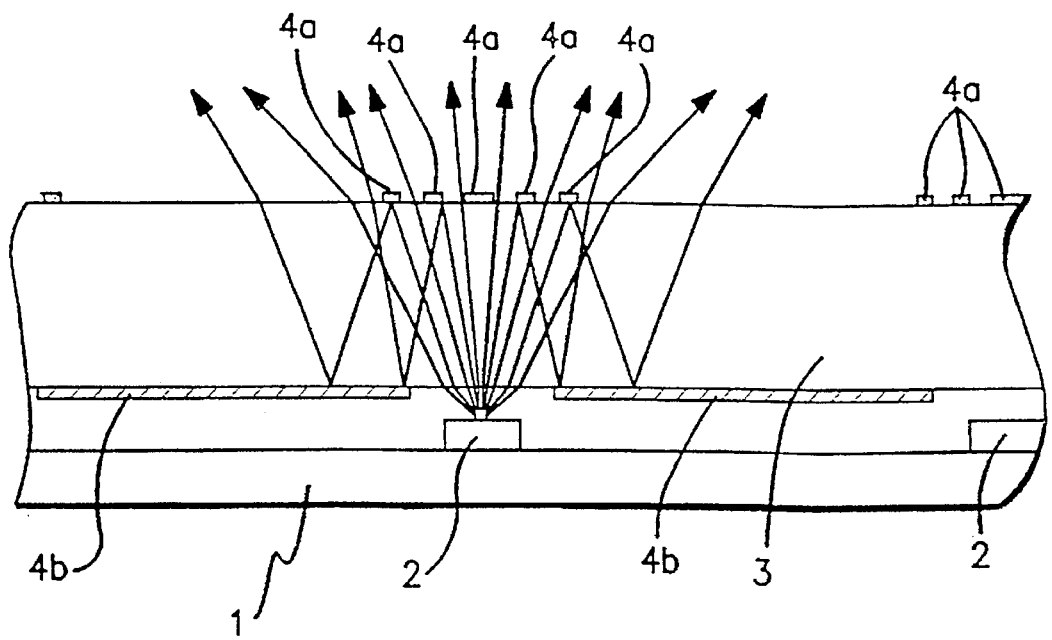
FIG. 1(b) is a sectional view taken along line 1B—1B in FIG. 1(a)
Figure 1C:
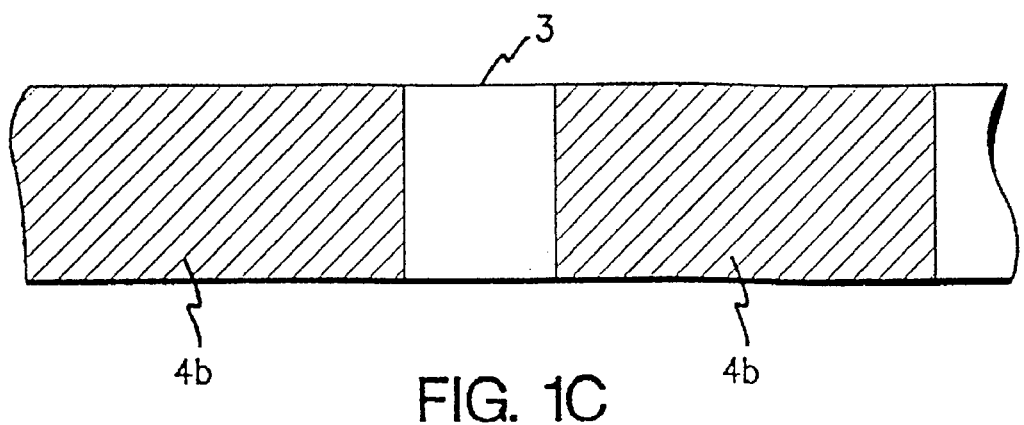
FIG. 1(c) is a plan view on the bottom of the light-transmitting member according to the first embodiment of the present invention.

Referring to FIG. 1, an LED-array comprises a plurality of LEDs 2 arranged in a row on an elongated printed circuit board 1. A long light-transmitting plate 3 such as glass or plastic is provided on the LED-array for leading output light from the LED-array to the surface of an original copy (not shown). A plurality of upper reflectors 4a and a lower reflectors 4b are formed on the top and bottom surfaces of the light-transmitting plate 3, respectively. As is shown in FIG. 1(a), the upper reflectors 4a have a strip-shaped pattern. Each strip is extended in a direction orthogonal to an alignment direction of the LEDs. The lower reflectors 4b are formed, as shown in FIG. 1(c), on the entire bottom surface except for the top of LEDs.

In the LED-array light source thus arranged, the output light from each LED 2 enters into the light-transmitting plate 3 through the window of the lower reflectors 4b provided on the bottom surface thereof, and is divided into light reflected by the upper reflectors 4a and light passing through slits of the upper reflectors 4a to irradiate the original copy disposed above the upper reflectors 4a. The light reflected by the upper reflectors 4a is directed toward the bottom surface and rereflected again by the lower reflectors 4b so as to irradiates the original copy by passing through an area between adjacent upper reflectors 4a.

Figure 2A:
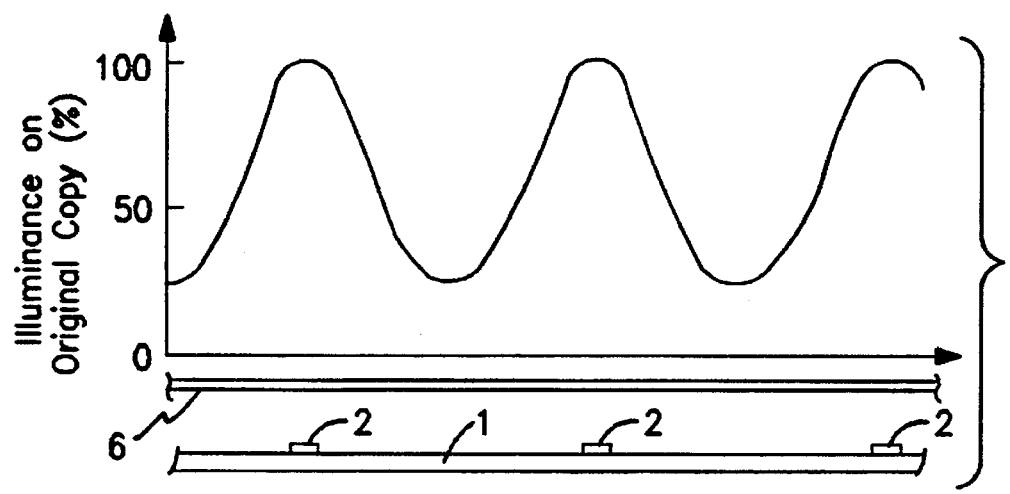
FIG. 2(a) is a graph for showing illuminance distribution without using a light-transmitting member of the present invention.

Now, description is made on the operation of the upper reflectors 4a and the lower reflectors 4b arranged as above. FIG. 2 shows examples of simulation on illuminance distribution on an original copy in a case where the LEDs are reduced in their number and arranged at a pitch of 16 mm. When the light-transmitting plate 3 of the present invention is not used, as shown in FIG. 2(a), the illuminance on an original copy 6 is high in the area immediately above the LED, but is remarkably lowered between the LEDs so that there is caused very noticeable variation in the illuminance distribution.

Figure 2B:
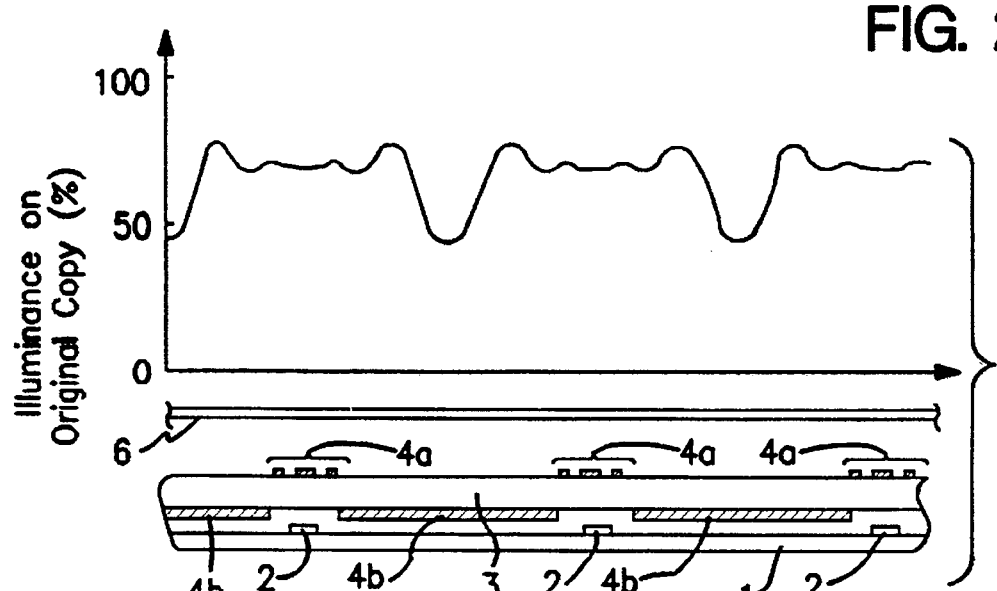
FIG. 2(b) is a graph for showing illuminance distribution using a light-transmitting member provided with top and bottom reflecting members.

The graph in FIG. 2(b) represents a case where the upper reflectors 4a in a form of three stripes is formed in correspondence to each LED. Illumination light reflected by the upper reflectors 4a is then reflected by the lower reflector 4b, and led to a region more remote from the LEDs 2, that is, a central area between adjacent LEDs which corresponds to the valley of illuminance distribution in FIG. 2(a). As the illumination light reflected by the upper and lower reflectors 4a and 4b contributes to increase the illuminance at the valley. Thus, as represented by FIG. 2(b), the uniformity of the illuminance distribution can be improved from about ±60% to about ±30% in term of ripple width when compared with a case of FIG. 2(a) while suppressing lowering of the quantity of light.

The ripple width used herein is an index representing the degree of uniformity, and can be defined as:

Ripple width=(MAX−MIN)/(MAX+MIN).

The lower ripple width indicates the higher degree of uniformity.

Figure 2C:
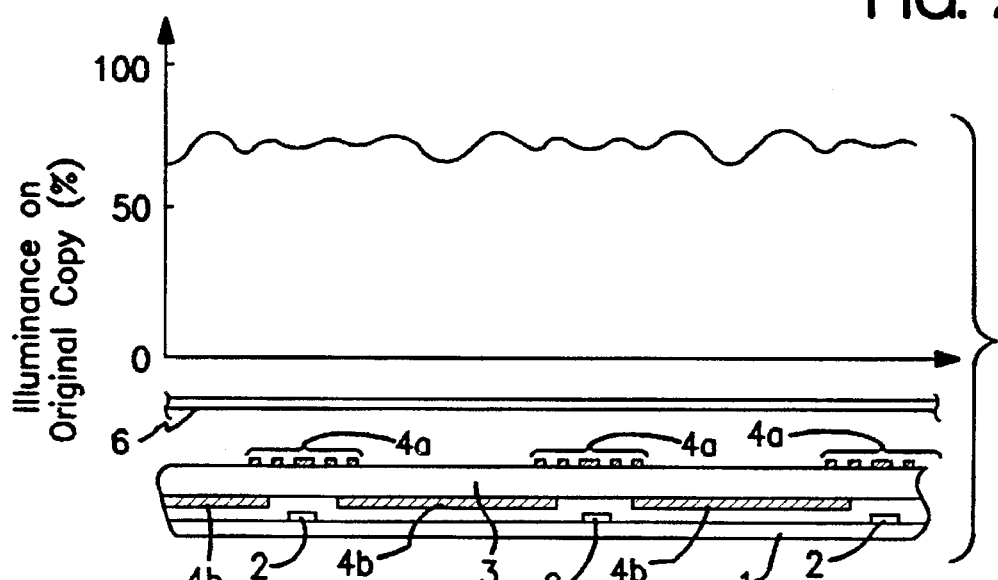
FIG. 2(c) is a graph for showing illuminance distribution using a light-transmitting member shown in FIG. 1.

The graph in FIG. 2(c) represents a case where an additional upper reflectors 4a of five stripes are formed to make further uniform the illuminance distribution represented by FIG. 2(b). The five-stripe upper reflectors 4a serves to lead the illumination light reflected by this upper reflectors 4a to the central area between adjacent LEDs which corresponds to the valley of illuminance distribution in FIG. 2(b), thereby contributing to increase the illuminance at that area. Thus, the ripple width can be improved from about ±30% to about ±10% over the case of FIG. 2(b) so that the illuminance distribution can be made uniform.

It is desirable to select a material with high reflectance for the upper and lower reflectors 4a and 4b. Metal such as aluminum is best suitable because it has high reflectance (about 0.9 when deposited) and can be prepared at low cost. It is of course not limited to aluminum as long as it conforms to the subject of the present invention.

The upper and lower reflectors 4a and 4b can be easily formed by deposition or printing. The size and number of the upper and lower reflectors 4a and 4b may be arbitrarily determined so that desired illuminance distribution can be obtained. Needless to say, the upper and lower reflectors 4a and 4b are formed such that the illumination light for a region with high illuminance can be led to a region with low illuminance to make the illuminance distribution uniform.

According to the embodiment, it can be designed that the upper and lower reflectors 4a and 4b are formed on the top and bottom of the light-transmitting plate 3, respectively, as shown in FIG. 1 so that the light reflected by the upper reflectors 4a is again reflected by the lower reflectors 4b to irradiate the surface of the original copy. In such case, since such reflected light can be arbitrarily led to the valley of illuminance distribution in FIG. 2(a), even if the number of LED devices 2 for use is reduced, it is possible to suppress decrease of illuminance in the valley so that uniform illuminance distribution can be attained. As a specific example, fourty-two LEDs are required for reading B-4 size original copy to maintain uniformity in a range not causing difficulty when the light-transmitting plate 3 is not used. In contrast, when the plate 3 of the embodiment is used, sixteen LEDs are sufficient, which means that, even if the number of LEDs 2 is reduced to about one-third, uniform illuminance distribution can be attained.

As described, when sixteen LEDs are used for reading B-4 size original copy, while the ripple width increases to about ±30% in the above-mentioned conventional arrangement, the embodiment can attain uniformity even if the ripple width is narrowed to about ±10%. Thus, there arises no problem in reading the original copy with the ripple width in such extent.

The positioning of the upper and lower reflectors is selected to satisfy such relationship that the light reflected by the striped upper reflector is rereflected again to the emitting surface as shown in the figure. In other words, if an opening is assured through which the output light at least from the LED device can transmit, the lower reflector can be provided on the entire surface of the incident surface of the light-transmitting plate.

Although, in the embodiment, the striped pattern is a linear pattern, it may be a curved pattern such as a concentric pattern in the prior art. However, a linear pattern as in the embodiment is more preferable in view of a linear light source and easiness in manufacturing.

In addition, the material of the light-transmitting plate may be glass or plastics as long as it is transparent to the output light of the LED. Furthermore, its shape is not limited to square in section, but may be a plate or another as indicated for an alternate embodiment which will be explained below by referring FIG. 3.

Figure 3A:
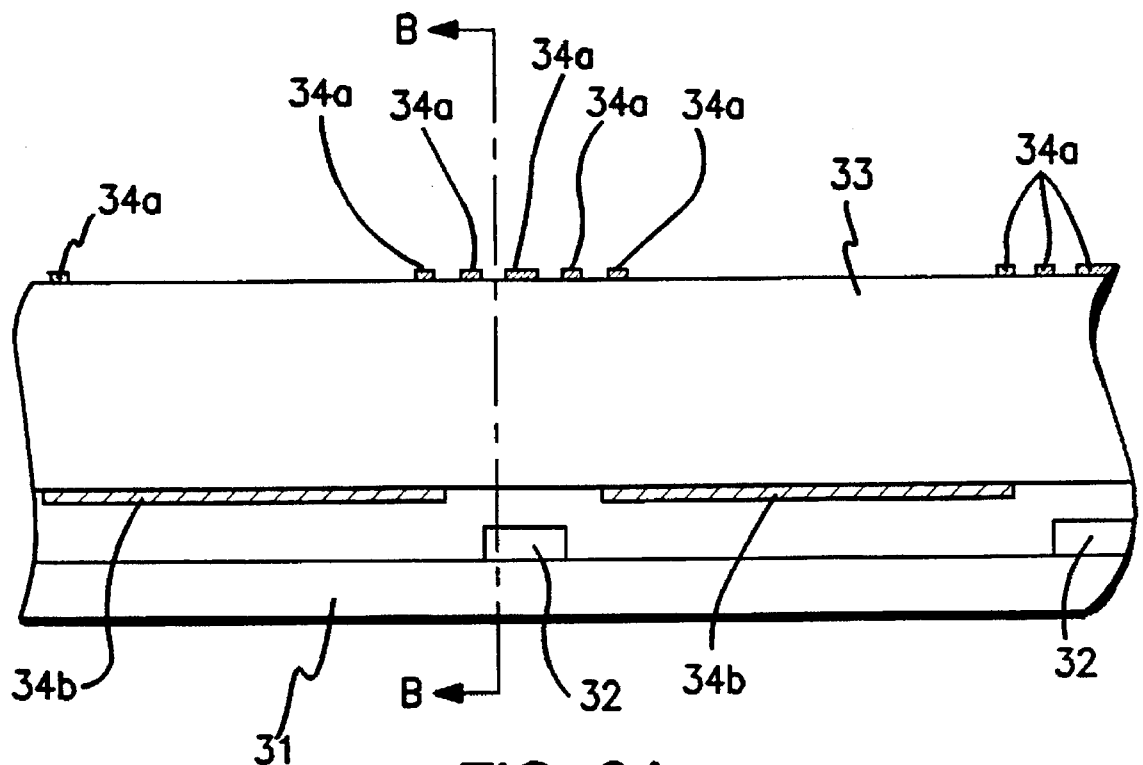
FIG. 3(a) is a sectional view in a direction of an LED-array according to the second embodiment of the present invention.
Figure 3B:
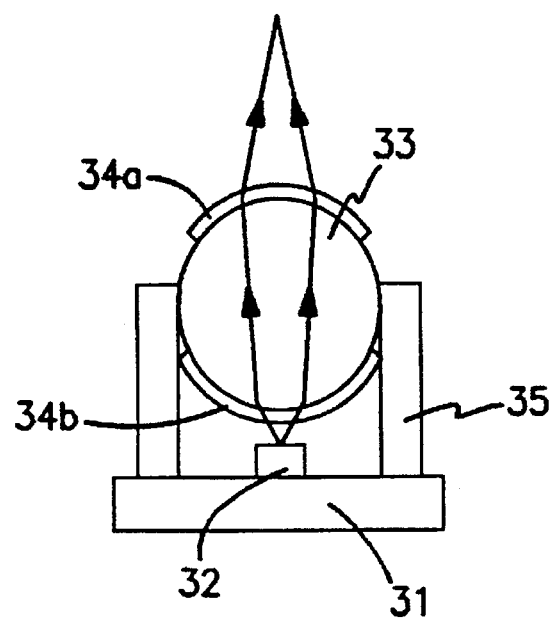
FIG. 3(b) is a sectional view taken along line 3B—3B in FIG. 3(a)

In FIG. 3(a), LEDs 32 are linearly arranged on an elongated printed circuit board 31 in a row. Placed on the top of LEDs 32 as a light-transmitting member is a cylindrical rod lens 33 with a circular cross section to read the illumination light from the LEDs 32 to an original copy (not shown) as shown in FIG. 3(b). Striped upper reflectors 34a are formed on the top of the light-transmitting rod lens 33, while the lower reflectors 34b are formed on the bottom of the light-transmitting rod lens 33. The upper reflectors 34a are formed in a striped pattern over the LED-array in a direction orthogonal to the direction for arranging the LEDs. On the other hand, the lower reflectors 34b are formed over entire surface except for the region above the LEDs 32. Since the light transmitting member is cylindrical, illumination light can be focused in a direction perpendicular to the direction arranging the LEDs.

In the LED-array light source thus arranged, illuminance in the region where the illuminance distribution is remarkably decreased can be increased in the direction arranging the LEDs by reflection as in the first embodiment than in the case where the light-transmitting rod lens 33 is not provided. In this case, the ripple width is about ±10% so that the illuminance distribution can be made uniform in the direction arranging the LEDs.

Furthermore, higher illuminance on the original copy can be obtained in the direction orthogonal to the direction arranging the LEDs by the focusing effect of the cylindrical light-transmitting lens 33.

Figure 4:
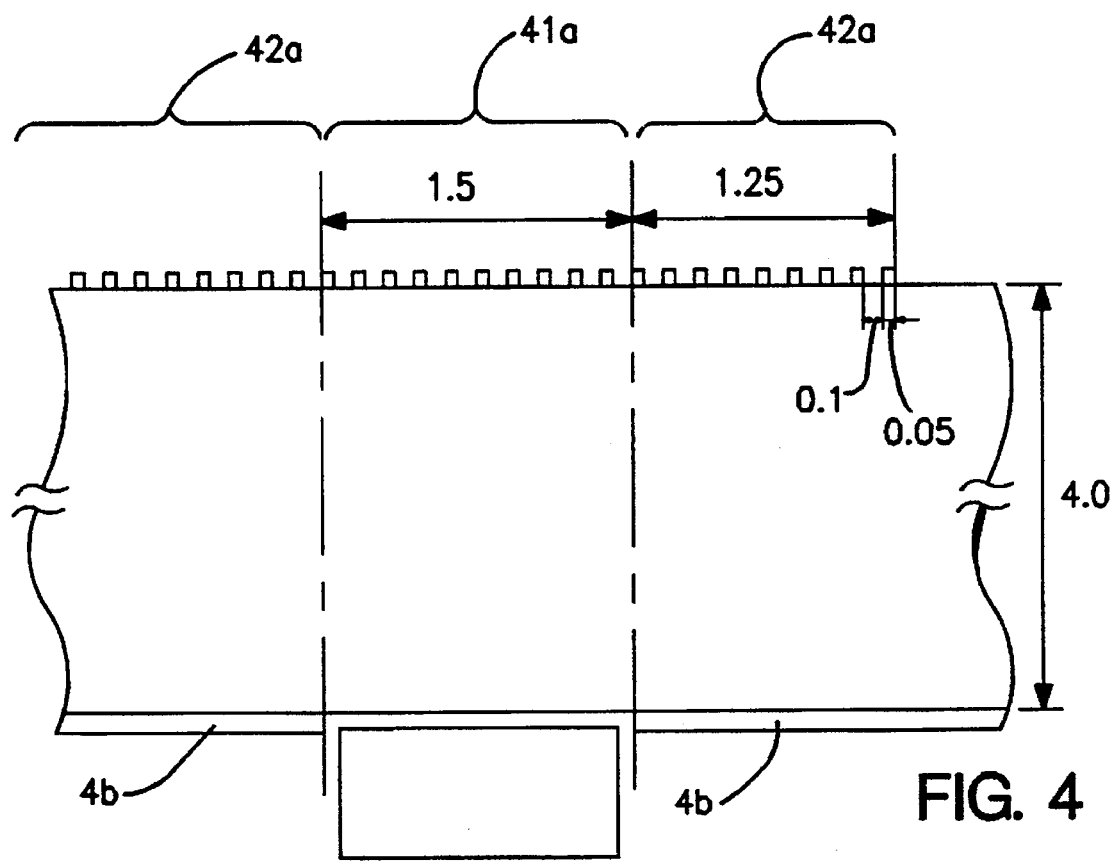
FIG. 4 is a sectional view of a third embodiment of the present invention.
Figure 5A:
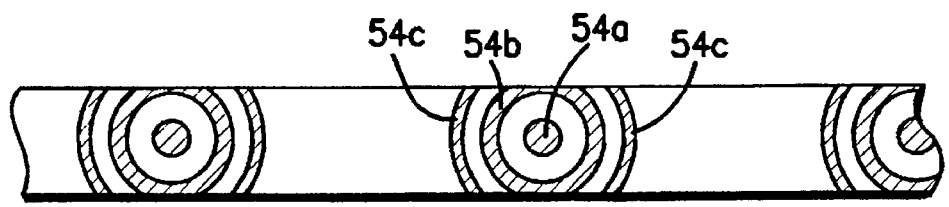
FIG. 5(a) is a plan view of a light adjusting mask of prior art.
Figure 5B:
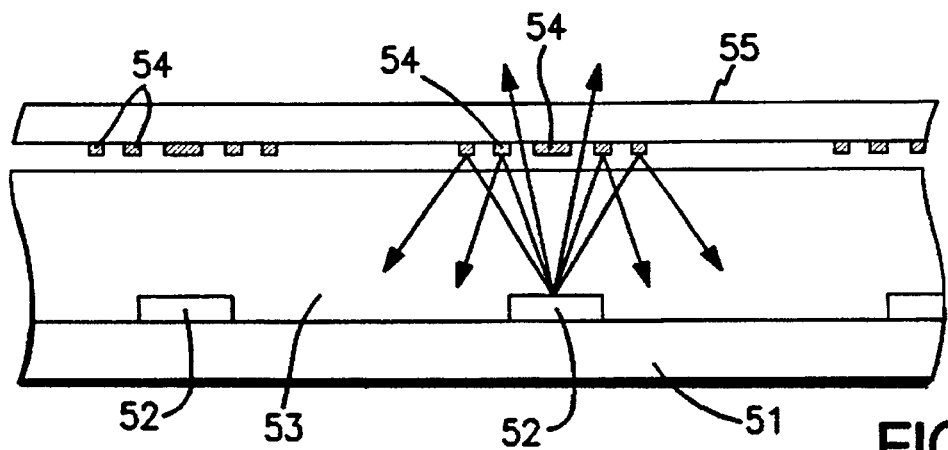
FIG. 5(b) is a sectional view taken along line C—C in FIG. 5(a).

In the foregoing, the stripe width of the upper reflectors 4a is not constant, but it may be made constant as described in the third embodiment shown in FIG. 4 as a typical example.

When using a glass plate 3 having a thickness of 4 mm, the lower reflectors 4b are formed entirely on the bottom surface of the glass plate 3 except for the window area of 1.5 mm width for receiving the output light of LED 2. Each of the upper reflectors 4a has a central reflecting region 41a opposite to the window area and a pair of peripheral reflecting regions 42a. The size of each of the upper reflectors 4a is 3.0 mm of length in the LED-arraying direction and has each stripe width of 0.05 mm with 0.1 mm gap between adjacent stripes. In this structure, a pitch of adjacent LEDs is 14.5 mm.

As described above, according to the present invention, the reflectors formed on the top and bottom of a light-transmitting member allow a portion of output light from the LEDs to irradiate an original copy through gaps or slits of the upper reflectors, while the light reflected by the reflectors is led to a top surface of a central region of the light-transmitting member corresponding to a central region between adjacent LEDs so that almost all output light from the LEDs can be effectively utilized to make uniform the illuminance distribution on the original copy in the LED-arraying direction.

What is claimed is:

1. An LED-array light source comprising an LED-array having a plurality of LEDs aligned in a first direction; a light-transmitting member elongated along said first direction so as to be disposed above said LED-array, said light-transmitting member having a first surface for receiving output light from said LED-array and a second surface for emitting said output light received at said first surface; a plurality of first light reflecting members provided on said second surface for reflecting said output light toward said first surface, each of said first light reflecting members having a central region opposite to each of said LEDs and a pair of peripheral regions opposite to an outside area of each of said LEDs; and a second light reflecting member provided on said first surface to reflect light reflected by said first light reflecting members toward said second surface.

2. An LED-array light source claimed in claim 1, wherein said second light reflecting member has a plurality of windows for passing said output light from said LED-array.

3. An LED-array light source claimed in claim 1, wherein each of said first light reflecting members has a parallel grid-shaped pattern.

4. An LED-array light source claimed in claim 1, wherein each of said peripheral regions of said first light reflecting member has a width smaller than that of said central region thereof.

5. An LED-array light source claimed in claim 1, wherein all of said first light reflecting members have the same width.

6. An LED-array light source claimed in claim 1, wherein said light-transmitting member is a cylindrical member having a longitudinal axis along said first direction.

7. An LED-array light source claimed in claim 3, wherein each grid of said first parallel grid-shaped pattern is extended in a second direction orthogonal to said first direction.

8. An LED-array light source claimed in claim 5, wherein each said first light reflecting member has a width smaller than a gap between adjacent said first reflecting members.

* * * * *